ized Patent [19]
Kozikowski

[11] 4,063,496
[45] Dec. 20, 1977

[54] CULINARY UTENSIL
[76] Inventor: Eugene Kozikowski, 8116 Darlene, Warren, Mich. 48093
[21] Appl. No.: 640,867
[22] Filed: Dec. 15, 1975
[51] Int. Cl.² .............................................. A47J 37/04
[52] U.S. Cl. .................................... 99/419; 99/421 H
[58] Field of Search ......................... 99/419, 420, 421; 211/181; 294/5, 103 CG, DIG. 2

[56] References Cited
U.S. PATENT DOCUMENTS

| D. 28,023 | 12/1897 | Thomforde | 294/5 X |
| 555,952 | 3/1896 | Hofheimer | 99/419 |
| 1,741,400 | 12/1929 | Bocchino | 99/421 H |
| 3,147,690 | 9/1964 | Smith | 99/421 H |

FOREIGN PATENT DOCUMENTS 301,262   9/1932   Italy ........................................ 99/419

Primary Examiner—Harvey C. Hornsby
Assistant Examiner—Arthur O. Henderson
Attorney, Agent, or Firm—Andrew R. Basile

[57] ABSTRACT

An improved culinary utensil adapted to connect to the rod portion of an ordinary barbecue skewer and thereby to accomplish not only the secure retention of the food desired to be cooked, but also the continuous positive flow of meat juices over said food surfaces.

5 Claims, 3 Drawing Figures

U.S. Patent    Dec. 20, 1977    4,063,496
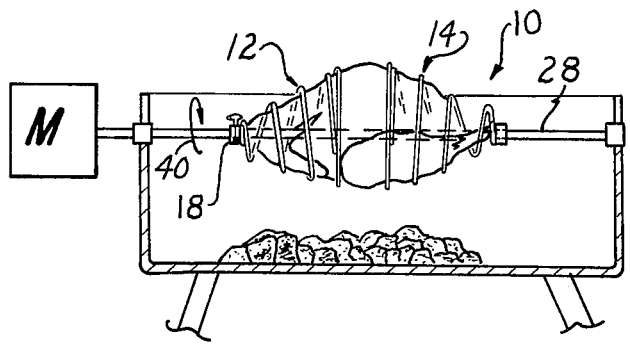
*Fig-1*
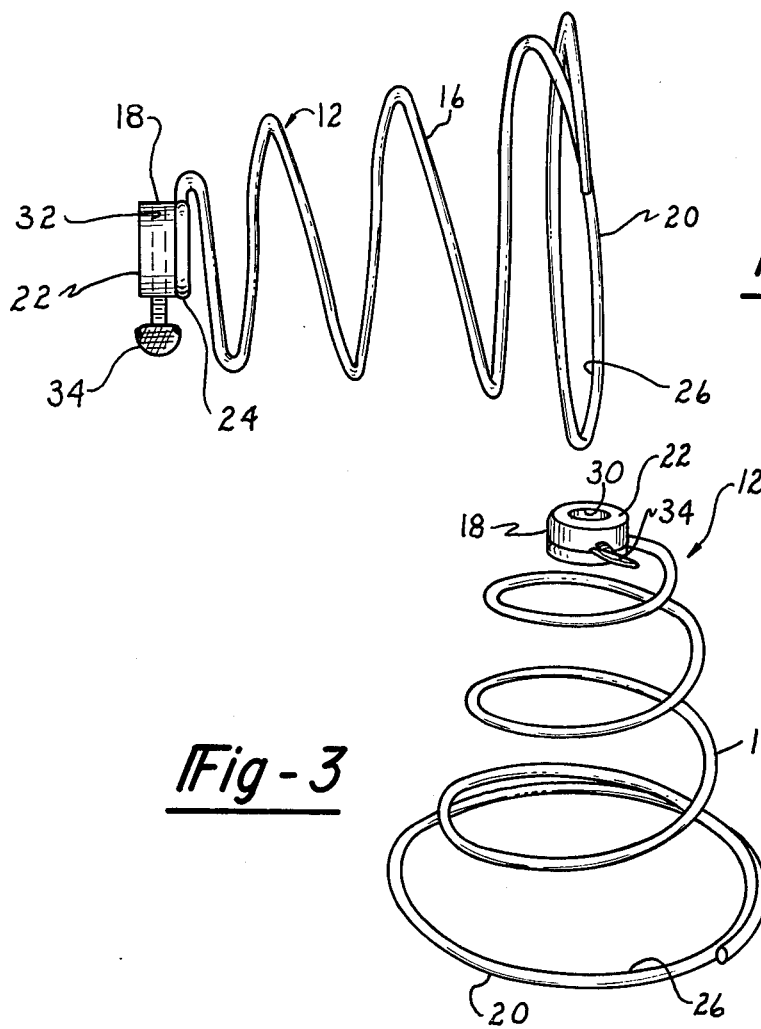
*Fig-2*
*Fig-3*

CULINARY UTENSIL

BACKGROUND OF THE INVENTION

I. Field of the Invention

This invention relates to culinary utensils and, in particular, to a culinary utensil adapted to the advantageous cooking of food over a fire resulting in an evenly cooked, juicy piece of meat.

II. Description of the Prior Art

In barbecuing meat, foul, or other such fleshy foods there are several options as to the method of cooking the food. The most common one in use is that of piercing opposing ends of the desired piece of food with the pointed extremities of long rod-like skewers. These skewers, in turn, are mounted on a holder device whereupon the skewers remain at rest for the duration of the cooking time or, in most cases, where the skewers rotate upon actuation of an appropriate motor. The rotating skewers represent a major advance from the caveman days of suspending the meat on a rope or a stick over an open fire, since the rotating skewers prevent the meat from burning on the fire-facing side.

However, even with such progress as the attempted rotation of food, there still remain many unfavorable, unsavory, and frankly inefficient aspects of barbecue cookery. One such problem is keeping the meat together, particularly if the food choice is fowl. The usual scene is a chicken twirling around a rotisserie with legs and wings flapping in the breeze. U.S. Pat. No. 1,741,400 attempts to provide a solution to this problem of containing the food with a wire basket of sorts which confines the cooking object. Another problem encountered in cooking food on a spit is that, as the skewers rotate, they do not always positively rotate the food and, thus, results the ancient situation of the fire-facing side being burned to a crisp, while the opposite side remains raw and cold. Although the holding device of U.S. Pat. No. 1,741,400 somewhat relieves this undesirable occurrence, still an additional obstacle opposes the successful and succulent roasting of a piece of food. Loss of meat juice is a continual problem in any method of cooking, and in barbecuing it becomes particularly impossible. Devices to overcome loss of the drippings consist mostly of pans and containers placed underneath the cooking meat to catch the juice as it falls from the meat. Picture these delicious juices collecting in a pan only to be reduced to a powdery film by the heat of the coals; simultaneously, picture the remaining dried-out meat whirling above on the spit. The ineffectiveness of this type of solution is apparent.

SUMMARY OF THE INVENTION

In order to obtain an evenly cooked, juicy and flavorful piece of meat, a device is provided which has means for insuring positive rotation of the food, members for confining the various parts of the piece of food being cooked, and provisions for retaining the meat juices, preferably in the meat.

It is therefore an object of this invention to provide a utensil of sufficient strength to hold fast a piece of meat while such utensil is rotating, thus assuring positive rotation of the meat with the utensil.

It is also an object of this invention to provide a utensil of such design and flexibility that different sized pieces of meat can be held by the same utensil on different occasions. For example, the same utensil could hold a 3 pound frying chicken one time and a 7 pound rump roast another time.

It is still an object of this invention to provide a utensil for cooking meat that is adaptable to any ordinary barbecue skewer in a simple and efficient manner.

A further object of this invention is to produce a utensil that will confine various members of the food to be cooked, such as the wings and legs on a chicken, for the purpose of preventing the charring and drying out of these members.

It is finally an object of this invention to provide a cooking utensil for roasting meat which will not only salvage the meat juices, but will return them to the cooking meat, thus, effecting a self-basting operation.

BRIEF DESCRIPTION OF THE DRAWING

These numerous objects are successfully realized in the advantageous features of the present invention hereinafter described and shown in the accompanying drawings in which like numerals refer to like parts and in which:

FIG. 1 is a cross-sectional view of a barbecue employing an improved culinary utensil constructed in accordance with the principles of the present invention;

FIG. 2 is a side elevational view of one of the improved culinary utensils illustrated in FIG. 1; and FIG. 3 is a perspective view of the improved culinary utensil illustrated in FIG. 2.

DESCRIPTION OF THE PREFERRED EMBODIMENT

Referring now to the drawing and, in particular, to FIG. 1 wherein there is illustrated one example of the present invention in the form of a culinary utensil 10 comprising two spiraled holding members 12 and 14. Each member 12 and 14 is made up of a spiral 16 which has a skewer receiving end 18 and a food receiving end 20. The skewer receiving end 18 on each of the holding members 12 and 14 integrally carries a collar 22 which has an axial bore 30 for receiving a skewer 28 and a radial bore 32 for receiving a wing screw 34. Additionally, the skewer receiving end 18 of each of the holding members 12 and 14 forms a circular configuration 24 which designates the beginning of the spiral 16; the food receiving end 20 of each of the holding members 12 and 14 forms a circular configuration 26 which designates the termination of the spiral 16, the circular configuration 24 having a diameter of about 1 inch and the circular configuration 26 having a diameter of approximately 5 inches resulting in each spiraled holding member 12 and 14 having a cone shape. The holding members 12 and 14 have a longitudinal length of approximately 5 inches.

As best seen in FIG. 1, the spiral 16 of holding member 12 begins at the skewer receiving end 18 with the spiral 16 being wound in a clockwise rotation (as viewed from the left) toward the circular configuration 24. The spiral 16 of holding member 14 begins at the skewer receiving end 18 with the spiral 16 being wound in a counterclockwise rotation (as viewed from the right) toward the circular configuration 24.

In practice, although several types of food may be cooked in the manner provided for by this invention, a chicken will be referred to throughout the following description of operation, since the roasting of a chicken utilizes all the features of the present invention.

The chicken, being prepared in the usual manner as far as washing and seasoning go, is inserted between the holding members 12 and 14 with the ends of the chicken being adjacent to the skewer receiving ends 18 of each holding member 12 and 14, while the mid section of the chicken is gripped by the circular configuration 26 of each holding member 12 and 14. Because of the flexibility of structure, it is to be understood that a slightly larger or slightly smaller chicken could be used, too. Ordinary barbecue skewers 28 are then positioned through the axial bore 30 in the collar 22 of each holding member 12 and 14, and the pointed tips of such skewers are further inserted to impregnate the end of the chicken. Disposal of the wing screws 34 in the radial bore 32 of the collar 22 and tightening of such screws 34 effects a firm attachment of the skewer 28 to the collar 22. Thus mounted, the skewers 28 are disposed by ordinary means for rotation upon actuation of an appropriate motor, and thereby the skewers 28 cause rotation of not only the holding members 12 and 14, but concurrently the chicken being graspingly held by the same holding members 12 and 14. The spring effect of the members 12 and 14 securly hold the chicken in place.

Once the chicken is so disposed, rotating over the coals, it begins to cook. Ordinarily the juices generated by the cooking chicken would be released via the holes punched in the chicken by the standard skewers 18 and would drip either onto the coals or into a container placed on the coals for the purpose of collecting such juices.

In the present invention, due to the opposite rotation of the spirals 16 on holding members 12 and 14 when the skewer 28 is rotated counterclockwise as indicated by arrow 40 in FIG. 1, the juice is released from the punctured hole at the skewer receiving ends 18 of each holding member 12 and 14; this juice is then drawn back over the chicken by the spiraling of the rotating holding members 12 and 14, since the spiraling has the effect of advancing the juices forward like a corkscrew. The continuous redirection of the meat juices back toward the center of the chicken and the food receiving end of the spiral 20 constitutes a partial conservation of the juice and, most importantly, an effective basting operation on the chicken.

Although the above description represents one way of utilizing the present invention, it is to be understood that there are other embodiments and adaptions of the utensil 10, all coming within the spirit of this invention.

What is claimed is as follows:

1. An improved culinary utensil to be used for the advantageous cooking of food such as poultry, fish, game, and other meats carried on a rotatable skewer, said utensil comprising a rotatably mounted skewer; two spiral spring-like food holding elements, each element comprising:
    a spiral member fabricated from a flexible material which permits radial stretching and axial compression of said spiral member, said spiral member having a skewer receiving end locating the beginning of said spiral member, and a food receiving end opposite said skewer receiving end locating the termination of said spiral member; and
    a collar integrally connected to said skewer receiving end of said spiral member, said collar having means for releasably engaging a skewer, said collars being carried on said skewer at longitudinally spaced locations such that their associated holding spiral members are axially compressed and radially expanded for securingly engaging said food.

2. The culinary utensil defined in claim 1 wherein said skewer receiving end of each of said holding members forms a circular configuration with a diameter of about 1 inch to permit concentric alignment of said skewer receiving end with said collar, and said food receiving end of said holding member designating the termination of said spiral forms a circular configuration with a diameter greater than 1 inch and large enough to accommodate the holding of a whole chicken, or whatever choice of food may be desired.

3. The culinary utensil defined in claim 1 wherein said holding members are constructed of a material of sufficient strength to successfully hold the weight of the article to be cooked and of sufficient flexibility to permit stretching and contracting of said spirals to graspingly receive and hold the food.

4. An improved culinary utensil to be used for the advantageous cooking of food such as poultry, fish, game, and other meats, said utensil comprising two spiral spring-like food holding elements, each element comprising:
    a spiral member having a skewer receiving end locating the beginning of said spiral member and a food receiving end opposite said skewer receiving end locating the termination of said spiral member; and
    a collar integrally connected to said skewer receiving end of said spiral member, said collar having means for releasably engaging a skewer;
    said spiral member of one holding element being wound in a clockwise rotation from said skewer receiving end and said spiral member of a second holding element being wound in a counterclockwise rotation from its said skewer receiving end, such antipodal convolutions resulting in the cooking juices, which would normally run out the holes punched in the food by the skewer at said skewer receiving ends of said holding elements, continually receding from the holes at said skewer receiving ends of said holding elements back toward the center of the cooking meat via said spiral members of said holding elements effecting a self-basting operation on the rotating food.

5. The culinary utensil defined in claim 1 wherein an ordinary barbecue skewer may be slidably inserted through an axial bore in said collar and said collar means for releasably engaging said skewer comprise a radial bore in said collar which threadingly receives a wing screw, the tightening of said wing screw resulting in a coupling of said barbecue skewer to said collar and therefore to said holding member.

* * * * *